June 28, 1960 H. V. KELTON 2,942,753
PRESSURE COOKER WITH VERTICALLY SHIFTABLE COVER AND EXHAUST THEREFOR
Filed June 8, 1959 2 Sheets-Sheet 1
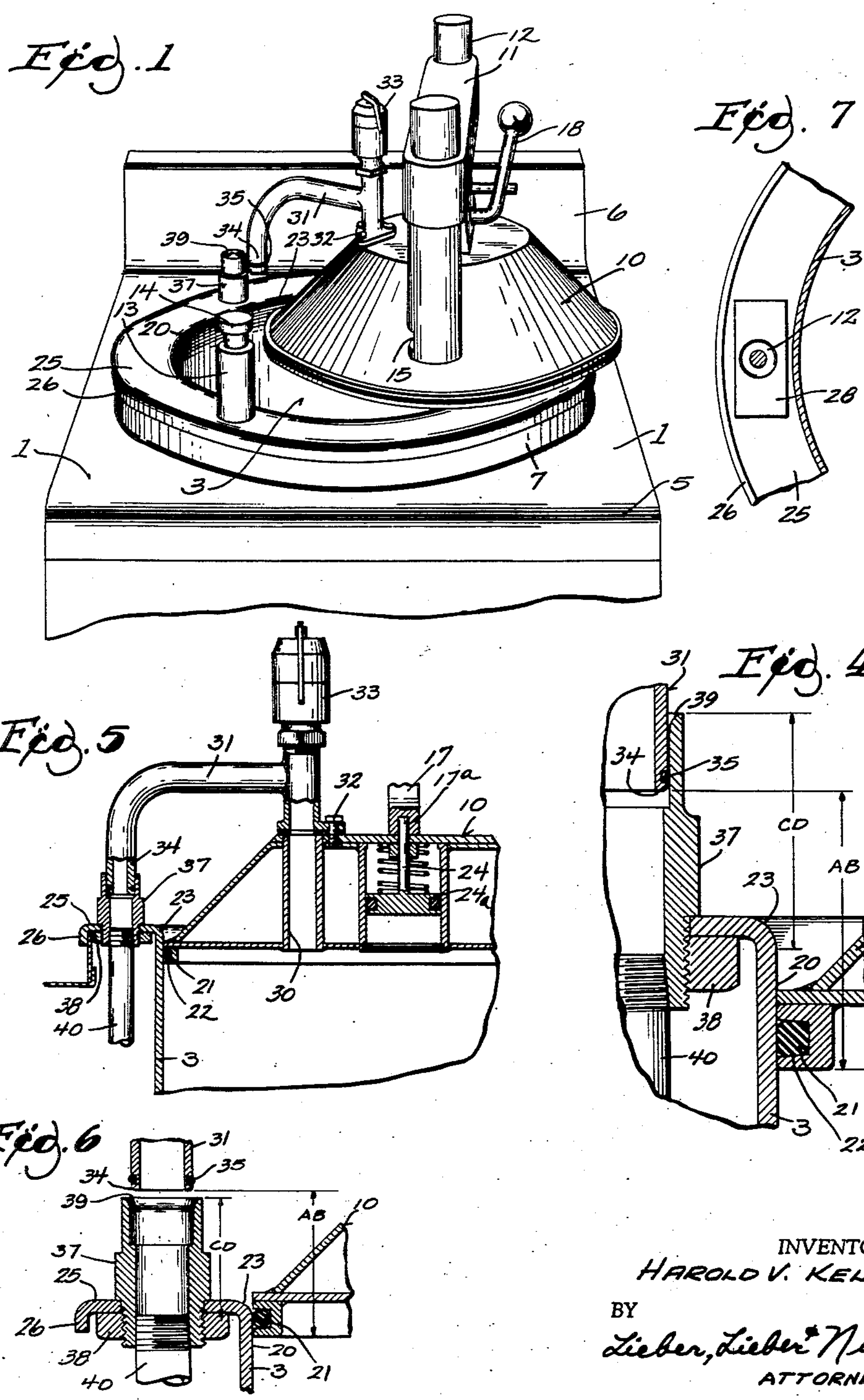
INVENTOR.
HAROLD V. KELTON
BY
Lieber, Lieber & Nilles
ATTORNEYS June 28, 1960 H. V. KELTON 2,942,753
PRESSURE COOKER WITH VERTICALLY SHIFTABLE COVER AND EXHAUST THEREFOR
Filed June 8, 1959 2 Sheets-Sheet 2
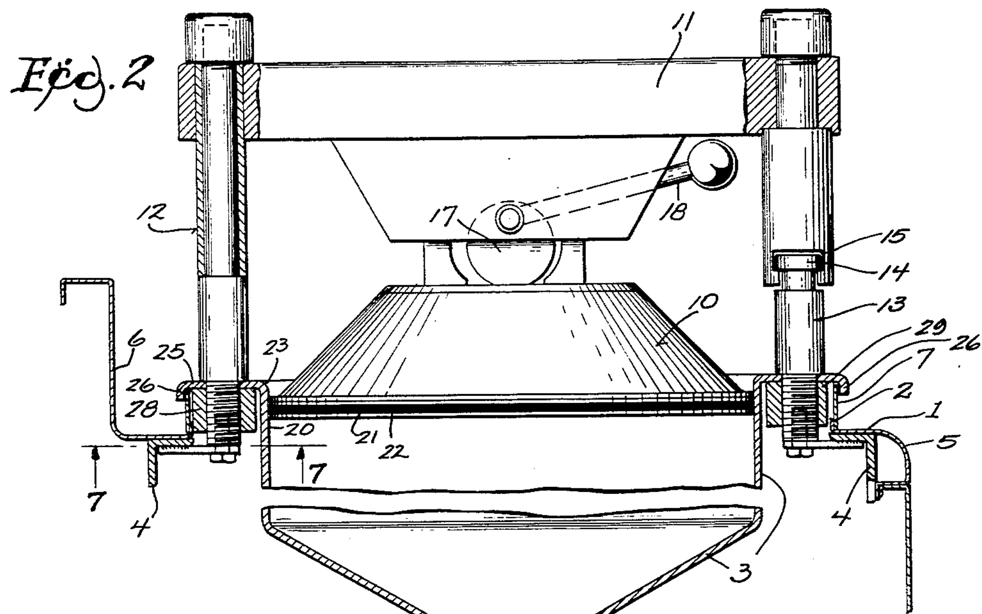
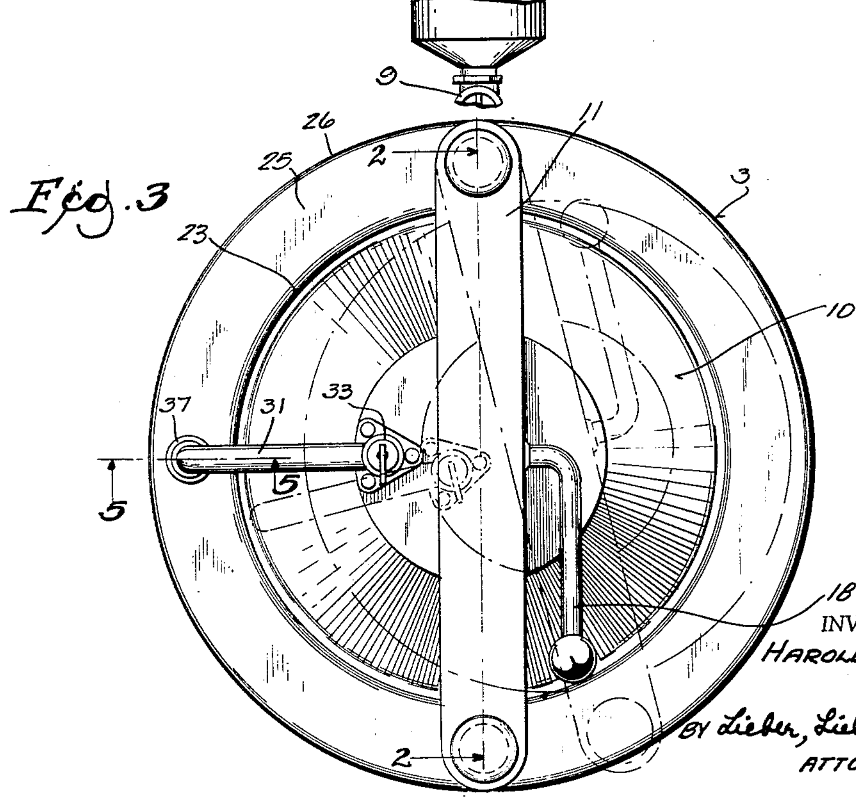
INVENTOR.
HAROLD V. KELTON
BY Lieber, Lieber & Nilles
ATTORNEYS

United States Patent Office 2,942,753
Patented June 28, 1960

2,942,753

PRESSURE COOKER WITH VERTICALLY SHIFTABLE COVER AND EXHAUST THEREFOR

Harold V. Kelton, South Beloit, Wis., assignor to Louis A. M. Phelan

Filed June 8, 1959, Ser. No. 818,654
10 Claims. (Cl. 220—33)

The present invention relates to high speed pressure cookers of the type in which the food to be processed is immersed in a very hot, non-aqueous and non-toxic cooking fluid and a cover of the cooking vessel is then lowered into the vessel for sealing therewith and locked in position. A pressure is quickly built up within the vessel, preferably through the use of moisture behing injected into the vessel.

Cooking devices of this type are large, often being on the order of 16 inches in diameter, and as a superatmospheric pressure in the vessel of 35 p.s.i. is commonplace, a considerable force acts on the cover tending to open it during the cooking operation. Therefore, the cover must be effectively sealed and securely locked in place during operation. In addition, the cooker should be incapable of being opened until the pressure has dropped to atmospheric in order to prevent any hot fat, at a usual temperature of 350 degrees F., from blowing out of the vessel.

Consequently, covers for these cookers are heavy, large, very hot and generally awkward to handle. On the other hand, speed and efficiency of operation are essential and, in quick-order eating establishments where these cookers find considerable utility, the cover must be opened and closed quickly and many times during the day. The operation of the cooker must be as effortless, safe and foolproof as possible.

The present invention utilizes a horizontally swingably yoke for supporting the cover, which cover is positively shiftable in either vertical direction to open or close the vessel. This general type of yoke is shown in the co-pending U.S. application Serial Number 605,872, filed August 23, 1956, and entitled "Pressure Cooker," now Patent No. 2,917,200 and by means of which subject matter the operator can easily and quickly open and close the cover by means of a lever operated cam. The arrangement is such that the cover cannot be opened until pressure in the vessel has been reduced to at least a predetermined value.

As previously mentioned, a non-toxic and non-aqueous cooking fat in the vessel is often brought up to a temperature of 350 degrees F., or even higher, depending on the type of food being cooked. Many cooking operations are performed during the day in which a basket of food is immersed in this fat and, after a cooking period of a few minutes, is withdrawn from the fat. As this fat is used, it becomes progressively more foamy in nature. In other words, as the fat gets older it bubbles and foams to such an extent that it must be discarded and replaced with new, clean fat. The location of the exhaust port for such a cooker is therefore important because when the fat reaches such a condition that it rises in the vessel to level of the exhaust conduit, it will be lost when it passes through the conduit and require replacement. Furthermore, the fat will plug the conduit to prevent proper pressure release therethrough. It is therefore important to locate the exhaust port at the maximum possible height in the vessel because when the cooking fat reaches this port it must be replaced with new cooking fat.

The above mentioned problems of the location of the exhaust port are dealt with in the co-pending U.S. application Serial Number 705,190, filed December 26, 1957, and entitled "Pressure Cooker," of which subject matter I am a co-inventor. The subject matter of that application has the exhaust port located in the cover, which is highly desirable, but the cover is mounted for swinging about a horizontal axis located at one side of the vessel, which particular mounting has proven satisfactory for certain installations. With a cover so mounted about a horizontal and particularly located axis, a swivel joint connection was provided for the exhaust between the cover and the rest of the cooker, which connection would always be in a coupled or exhaust-transmitting condition.

One of the problems in using a vertically shiftable cover of the type shown in said application Serial Number 605,872, now Patent No. 2,917,200 and also utilized in the present invention, is in providing an exhaust port in the cover of the vessel and connecting the port with the rest of the cooker. Such a connection must be coupled and uncoupled without any attention on the part of the operator and the use of a flexible connection for this purpose has not been acceptable due, inter alia, to sanitary requirements and heat and pressure problems.

In accordance with the present invention there has been provided a pressure cooker of the type having a truly vertically shiftable cover, which has an improved means for conducting exhaust from the cooker through the cover and directing it to a relatively stationary location.

More specifically, the invention provides an exhaust means of the above type in which a conduit extends from a port in the cover and is rigidly carried by the cover for both vertical shifting and swinging movement therewith. This conduit terminates in a downwardly extending end which is precisely aligned with its complementary socket on the frame of the cooker when the cover is in vertical alignment with the vessel. The arrangement is such that when closing the cover, the cover must be actually commencing to enter the cylindrical sealing surface of the vessel before the end of the exhaust conduit begins to enter its complementary stationary socket. When opening the cover, the exhaust conduit must have cleared the socket before the cover begins swinging in a horizontal plane. Thus the larger and stronger cover acts as a precise guide means for the relatively weaker conduit connection.

Other objects and advantages will appear later as this disclosure progresses, reference being had to the accompanying drawings, in which:

Figure 1 is a fragmentary perspective view of a pressure cooker embodying the present invention and showing the cover in the partially open position;

Figure 2 is a side elevational view, of the cooker in the closed position, partially in section and broken away, and taken generally through the support yoke for the cover and along line 2—2 of Figure 3;

Figure 3 is a plan view of the cooker as shown in Figure 2 and showing a moved position of the cover and exhaust conduit in broken lines;

Figure 4 is an enlarged, fragmentary, detail view of the cover when in the sealing position;

Figure 5 is a fragmentary sectional view taken generally along line 5—5 of Figure 3;

Figure 6 is an enlarged detail view of a portion of Figure 5 but showing the cover when it commences to engage the internal cylindrical sealing surface of the vessel, and Figure 7 is a detail view taken along the line 7—7 in Figure 2.

Referring in greater detail to the drawings, a sheet metal counter top 1 has a circular opening therein defined by an upwardly turned flange 2, in which is mounted the cylindrical sheet metal vessel 3. An angle iron frame 4 rigidifies the counter top and supports the weight of the vessel. The counter top is formed as a round corner 5 along its front edge and is turned upwardly at its rear edge to form a back wall 6.

A collar or sleeve 7 snugly surrounds the flange 2 of the counter top and extends upwardly therefrom.

The vessel 3 is preferably formed of stainless steel and by a deep draw process. The bottom of the vessel terminates in a sump 8 having a clean out valve 9 at the lowermost end.

As previously mentioned, the cover 10 is mounted on a horizontally swingably yoke 11 which is hinged on pivot column 12 at one side of the vessel. On the opposite side of the vessel is secured a locking column 13 which has a head 14 that is engaged by the slot 15 of T-shaped cross section in the yoke when the latter is in the closed position. The locking column 13 acts as a guide for accurately locating the cover above the vessel for engagement therein. The cover is forcibly moved in either vertical position by the cam 17 fixed to the hand lever 18. In this manner the cover is forcibly raised above the vessel to the open position shown in Figure 1 or forcibly lowered to the closed position within the vessel, as shown in Figures 2 to 5 inclusive.

The upper internal cylindrical surface 20 of the vessel is the sealing area against which is compressed the O-ring 21 carried in the groove 22 of the cover. This surface is of a very smooth finish so as to prevent wear of the O-ring and insure positive sealing thereby. As the O-ring is slid over this surface many times, a proper sealing relationship between area 20 and the ring must be provided for good life of the O-ring.

With this sealing arrangement, once the O-ring has engaged the cylindrical sealing surface 20, it is in a position to effect a seal and pressure can immediately be built up within the vessel. Stated otherwise, the O-ring can provide the sealing function regardless of its precise vertical position along the sealing surface. Therefore, as soon as the O-ring moves downwardly past the rounded corner 23 of the vessel it begins its sealing function. The rounded corner 23 acts to compress the O-ring initially, to facilitate entry of the cover into the vessel.

It is essential, with such a sealing arrangement, that the concentricity of the upper end of the vessel be maintained precisely so that the cover can move freely therein and at the same time insure that a proper sealing action occurs. A means for providing this concentricity and alignment between the cover, vessel and the other associated parts, is shown and described in the said application Serial Number 605,872, now Patent No. 2,917,200, and takes the form of a ring which is shrink-fitted around the upper portion of the vessel. That ring also acts as a guide for accurately locating the side columns which support the cover. If a more detailed description of this sealing action, or the cam operated lever for shifting the cover is deemed necessary or desirable, reference may be had to that application. In regard to the latter feature, it is believed sufficient to say that the cam 17 has a bore 17*a* (Fig. 5) into which the rod 24 of the piston 24*a* extends when pressure above a predetermined amount exists in the vessel, thus preventing opening of the cover.

In the present case, an outwardly turned flange 25 is formed integrally with the vessel and at the same time that the deep drawn process of the vessel takes place. A downwardly turned flange 26 is also formed simultaneously around the outer edge of the horizontal flange 25. The vessel rests on the sleeve 7 by its flange 25.

Columns 12 and 13 extend through flange 25 and are threadably engaged in anchor blocks 28 and 29, respectively.

Thus, the cover may be vertically shifted with respect to both its supporting yoke and the vessel. The cover is also swingable together with the yoke, and in respect to the vessel, about its pivot column 12.

In accordance with the present invention, means have been provided for exhausting the cooking fat in the vessel through an exhaust port located in the swingable cover and to a stationary socket located preferably adjacent to the cover when the latter is in the closed position.

As shown in Figure 5, a port 30 is provided in the cover which terminates in the upper side thereof. A conduit fitting 31 is secured, by bolts 32, in communication with the port. The upper portion of this fitting carries a conventional pressure relief valve 33, which valve could also be located elsewhere in the cover, if desired. The conduit fitting extends horizontally and then downwardly where it terminates in an inter-engaging portion in the form of a free end 34 having a sealing O-ring 35 therearound. The arrangement is such that the free end terminates over the flange when the cover is in the closed position.

More particularly, the free end is alignable with a complementary inter-engaging member in the form of a socket fitting 37 which extends through flange 25 and is held captive therein by the anchor block 38 located beneath the flange and with which block it is threadably engaged.

The upper end of the tubular socket member 37 has an internal chamfer 39 which acts to initially compress the O-ring 35 upon entering the bore of the fitting 37. A pipe 40 is threadably engaged with the lower end of member 37 and serves to conduct the exhaust material to a collecting pail, or the like (not shown), located in the bottom of the cabinet.

Instead of the form of construction shown for illustrative purposes, the socket member may be located on the free end of the conduit fitting and the male inter-engaging portion with its O-ring seal could be secured to or adjacent to vessel flange.

The cover, due to its large size and construction and also due to the fact that it is mounted directly under the cam, will not be damaged if it is inadvertently closed down against the flange 25 of the vessel. Furthermore, the cover is aligned with the vessel by means of the locking column 13 and slot 15 on the yoke and guided into the upper end of the vessel.

As the cover is moved downwardly by the cam, the cover enters the pot and is positioned in the cylindrical sealing surface 20 as soon as it passes the lower rounded corner 23. This is the position shown in Figure 6 at which time the lower end 34 of the exhaust conduit is still clear of the socket member 37. Therefore, the conduit end 34 is precisely aligned with its socket, by the guiding action of the cover and vessel, before it engages the socket. As a result, bending or other damage to the relatively weak and off-center conduit manifold fitting due to improper striking the socket member, is prevented. This is accomplished by making the distance from the bottom end 34 of the exhaust to the bottom of the cover (represented by the line AB) greater than the distance from the top of the socket member 37 to the upper extreme end of the internal cylindrical surface of the vessel (represented by line CD).

Furthermore, as shown in Figure 4, the distance AB should be greater than the distance of penetration of the bottom of the cover into the vessel (represented by line BE), so that if the cover is moved down when not directly aligned above the pot, the cover will hit the flange 25 before the exhaust end 34 hits that flange. For this reason the socket member 37 extends above the flange and precludes a design in which a recession fitting for the exhaust is located below flange 25.

With the above construction and dimensioning of the parts, problems due to small errors in swinging the cover completely and precisely into alignment with the vessel, or due to side play in the support mechanism, have been overcome; the radius 23 on the upper end of the vessel guides the cover into the proper sealing position as its sealing edge is lowered and before the end of the exhaust conduit comes down to the level of the top of the socket member 37. Thus the exhaust conduit is always in alignment with its socket upon entering the latter and cannot be damaged by improper contact therewith.

Various modes of carrying out the invention are contemplated as being within the scope of the following claims particularly pointing out and distinctly claiming the subject matter which is regarded as the invention.

What is claimed and desired to be secured by Letter Patent is:

1. In a pressure cooker, the combination comprising, a vessel having an internal cylindrical sealing surface which defines an open top, a cover having a sealing edge around its periphery, said cover being mounted for vertical shifting between an open position in which it is located above the vessel and a closed position in which its sealing edge engages said sealing surface, said cover also being mounted for horizontal swinging relative to said vessel between a position aligned directly above said vessel and a position to one side thereof, a rigid exhaust conduit secured to said cover and extending outwardly therefrom and terminating in a generally downward extending interengaging portion, and a complementary interengaging member mounted on said cooker and terminating in an open upper end so as to engage and be in fluid receiving communication with said interengaging portion when said cover is moved downwardly into said vessel.

2. A device as defined in claim 1 further characterized in that when said cover is closed, the vertical distance from the lowermost portion of said sealing edge is less to the top of the vessel than it is to the bottom of said interengaging portion.

3. A pressure cooker comprising, a cylindrical vessel having an internal cylindrical sealing surface which defines an open top, a cover having seal means around its periphery, said cover being mounted for vertical shifting between an open position in which it is located above the vessel and a closed position in which its seal means engages said sealing surface, said cover also being mounted for horizontal swinging relative to said vessel between a position aligned directly above said vessel and a position to one side thereof, an exhaust port extending through the top of said cover, an exhaust conduit rigidly fastened to said cover in communication with said port and extending outwardly from said cover and terminating in a downwardly extending free end, and a stationary socket member mounted on said cooker and adjacent said vessel and terminating in an open upper end, said upper end being adapted to sealingly receive said conduit free end when said cover is moved downwardly into engagement with said sealing surface.

4. In a pressure cooker, the combination comprising, a vessel having an internal cylindrical sealing surface which defines an open top, a cover having a sealing edge mounted for vertical shifting between an open position in which it is located above the vessel and a closed position in which it engages said sealing surface, said cover also being mounted for horizontal swinging relative to said vessel between a position aligned directly above said vessel and a position to one side thereof, a rigid exhaust conduit fastened to said cover and extending outwardly therefrom and terminating in a generally downward extending free end, and a stationary socket on said cooker and terminating in an open upper end, said upper end being adapted to receive said conduit free end when said cover is being moved downwardly into said vessel, the vertical distance between the lowermost portions of said sealing edge and said free end being greater than the vertical distance between the uppermost portions of said cylindrical sealing surface and said socket upper end.

5. A device as defined in claim 4 further characterized in that the vertical distance from the lowermost portion of said sealing edge is less to the top of the vessel than it is to said conduit free end.

6. In a cylindrical pressure cooker vessel having an open top, a horizontally swingable support pivotally mounted at one side of the vessel, a cover slidably mounted on said support and in a vertical direction in respect thereto, said cover adapted to slide downwardly into said vessel for sealing thereof and slide upwardly above said vessel for opening the latter, said support and said cover swingable together in a horizontal direction between a position at one side of said vessel and an aligned position directly above said vessel, the improvement comprising, an exhaust conduit mounted on said cover and extending outwardly therefrom and terminating in a generally downward extending free end, and a stationary socket mouted adjacent said vessel and having an upwardly facing upper end with which said free end is adapted to be sealingly coupled, said socket upper end and said conduit free end being in precise vertical alignment but uncoupled from one another when said cover commences to enter said vessel.

7. A device as set forth in claim 6 further characterized in that the vertical distance from a lowermost portion of said sealing edge is less to the top of the vessel than it is to said free end.

8. In a cylindrical pressure cooker vessel having an open top, a horizontally swingable support means pivotally mounted at one side of the vessel, a cover slidably mounted on said support means and in a vertical direction in respect thereto, said cover having a sealing edge which is adapted to slide downwardly into said vessel for sealing thereof and slide upwardly above said vessel for opening the latter, said support means and said cover swingable together in a horizontal direction between a position at one side of said vessel and an aligned position directly above said vessel, the improvement comprising, an exhaust conduit mounted on said cover and extending outwardly therefrom and terminating in a generally downward extending free end, and a stationary socket mounted adjacent said vessel and having an upwardly facing upper end with which said free end is adapted to be sealingly coupled, said socket upper end and said conduit free end being in precise vertical alignment from one another when said cover commences to enter said vessel, the arrangement and relative dimensions of the parts being such that the vertical distance between the lowermost portions of said sealing edge and said free end is greater than the distance between the uppermost portions of said cylindrical sealing surface and said socket upper end.

9. A device as set out in claim 8 wherein the vertical distance from a lowermost portion of said sealing edge is less to the top of the vessel than it is to said conduit free end.

10. In a pressure cooker, the combination comprising, a vessel having an integrally formed and outwardly flared flange at its upper end, said vessel also having an internal cylindrical sealing surface adjacent said flange and which defines an open top, a cover having a sealing edge around its periphery, said cover being mounted for vertical shifting between an open position in which it is located above the vessel and a closed position in which its sealing edge engages said sealing surface, said cover also being mounted for horizontal swinging relative to said vessel between a position aligned directly above said vessel and a position to one side thereof, a rigid exhaust conduit secured to said cover and extending outwardly therefrom and terminating in a generally downward extending free end, and a socket member mounted on said flange and terminating in an open upper end, said upper end being adapted to receive said conduit free end when said cover is being moved downwardly into said vessel.

References Cited in the file of this patent

UNITED STATES PATENTS

| | | |
|---|---|---|
| 893,808 | Napier | July 21, 1908 |
| 1,070,128 | Gross | Aug. 12, 1913 |
| 1,545,352 | Rodriguez | July 7, 1925 |
| 1,892,587 | Schmieg | Dec. 27, 1932 |
| 2,120,961 | Beede | June 21, 1938 |
| 2,917,200 | Phelan et al. | Dec. 15, 1959 |